(12) United States Patent
Guo

(10) Patent No.: US 8,055,297 B2
(45) Date of Patent: Nov. 8, 2011

(54) PORTABLE ELECTRONIC DEVICE

(75) Inventor: Ming-Lung Guo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 634 days.

(21) Appl. No.: 12/170,740

(22) Filed: Jul. 10, 2008

(65) Prior Publication Data

US 2009/0104935 A1 Apr. 23, 2009

(30) Foreign Application Priority Data

Oct. 22, 2007 (CN) .......................... 2007 1 0202194

(51) Int. Cl.
*H04M 1/00* (2006.01)

(52) U.S. Cl. .................. 455/556.1; 455/575.1; 348/374; 348/375; 348/376

(58) Field of Classification Search ............... 455/556.1, 455/575.1, 575.2–575.8; 348/375, 373, 374, 348/376

See application file for complete search history.

(56) References Cited

U.S. PATENT DOCUMENTS

| | | | | |
|---|---|---|---|---|
| 6,678,074 B1 * | 1/2004 | Huang | ........................... | 358/474 |
| 7,565,183 B2 * | 7/2009 | Vance et al. | ................ | 455/575.1 |
| 7,567,287 B2 * | 7/2009 | Hyatt | ............................ | 348/340 |
| 7,599,722 B2 * | 10/2009 | Makishima | ................ | 455/575.3 |
| 2003/0040346 A1 * | 2/2003 | Fukuda et al. | ................. | 455/575 |
| 2003/0164895 A1 * | 9/2003 | Viinikanoja et al. | .......... | 348/375 |
| 2004/0116166 A1 * | 6/2004 | Makishima | ................ | 455/575.1 |
| 2005/0101348 A1 * | 5/2005 | Wang | ......................... | 455/556.1 |
| 2007/0285562 A1 * | 12/2007 | Raynor | ........................ | 348/373 |
| 2007/0291143 A1 * | 12/2007 | Barbieri et al. | ............... | 348/264 |
| 2008/0088732 A1 * | 4/2008 | Lin | ............................... | 348/347 |

FOREIGN PATENT DOCUMENTS

CN 2739653 Y 11/2005

* cited by examiner

*Primary Examiner* — Edward Urban
*Assistant Examiner* — Rui Hu
(74) *Attorney, Agent, or Firm* — Altis Law Group, Inc.

(57) ABSTRACT

A portable electronic device includes a housing and a main body. The housing has an image pickup window. The main body is accommodated in the housing. The main body includes a first lens module, a second lens module, a rotatable base and a driving element. The rotatable base carries the first lens module and the second lens module thereon. The driving element is configured for driving the rotatable base to rotate to selectively allow the first lens module or the second lens module to be aligned with the image pickup window.

8 Claims, 6 Drawing Sheets

PORTABLE ELECTRONIC DEVICE

BACKGROUND

1. Field

The present invention generally relates to portable electronic devices, and particularly to a portable electronic device with an image pickup device.

2. Description of Related Art

Currently, portable electronic devices, such as portable computers, personal digital assistants (PDAs), cellular telephones are now in wide spread use. Along with the increasingly widespread use of such devices, there is a demand for developing portable electronic devices with multifunction, such as incorporating an image pickup function. Meanwhile, volume reduction is also a trend for such products.

Camera module of the portable electronic devices are generally equipping with, for example, a wide-angle lens module and a zoom lens module for achieving wide-angle image pickup function and zooming image pickup function, respectively. However, with both the wide-angle lens module and zoom lens module arranged in the portable electronic devices, volume of the portable electronic devices increases dramatically.

What is needed, therefore, is a portable electronic device with multiple image pickup functions and having reduced volume.

SUMMARY

A portable electronic device is provided. In one present embodiment, the portable electronic device includes a housing and a main body. The housing has an image pickup window. The main body is accommodated in the housing. The main body includes a first lens module, a second lens module, a rotatable base and a driving element. The rotatable base carries the first lens module and the second lens module thereon. The driving element is configured for driving the rotatable base to rotate to selectively allow the first lens module or the second lens module to be aligned with the image pickup window.

Another portable electronic device is provided. In one present embodiment, the portable electronic device includes a housing, a supporting base, a plurality of camera modules and a driving element. The housing has an image pickup window. The supporting base is received in the housing. The supporting base is rotatable about a rotating axis. The camera modules are mounted on the supporting base. Each of the camera modules includes an image sensor and a lens module. Each lens module has an optical axis perpendicular to the rotating axis. The optical axes of the lens modules extend radially with respect to the rotating axis. The driving element is configured for driving the supporting base to rotate to selectively align one of the camera modules with the image pickup window.

Advantages and novel features of the present portable electronic device will become more apparent from the following detailed description of preferred embodiments when taken in conjunction with the accompanying drawings.

BRIEF DESCRIPTION OF THE DRAWINGS

The components in the drawing are not necessarily drawn to scale, the emphasis instead being placed upon clearly illustrating the principles of the present invention.

Figure 1:
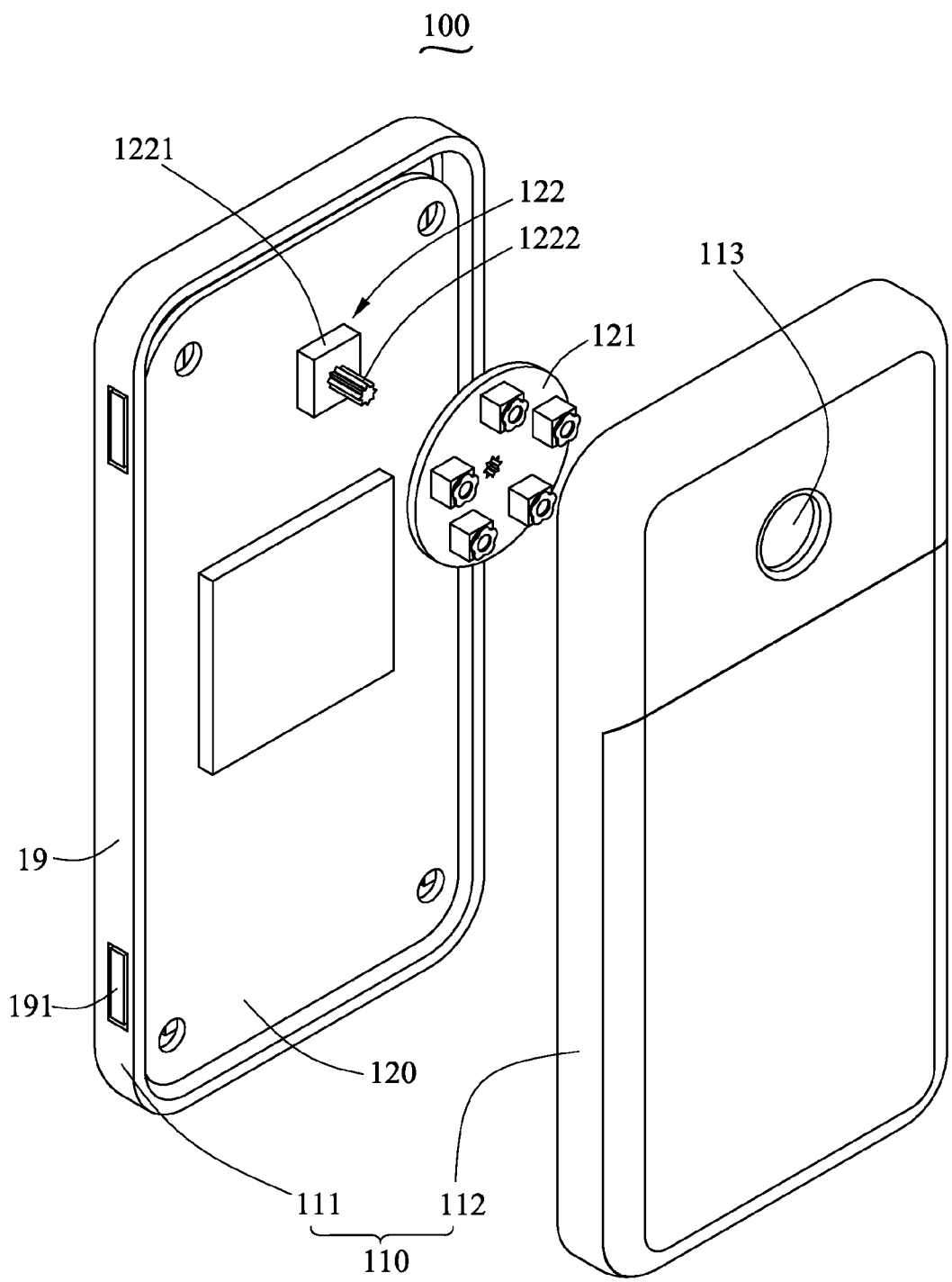
FIG. 1 is a schematic exploded view of a portable electronic device in accordance with a first embodiment of the present invention.

Corresponding reference characters indicate corresponding parts. The exemplifications set out herein illustrate two preferred or exemplary embodiment of the present portable electronic device, in various form, and such exemplifications are not to be construed as limiting the scope of the invention in any manner.

DETAILED DESCRIPTION OF THE EMBODIMENT

Reference will now be made to the drawings to describe embodiments of the present portable electronic device in detail.

Figure 2:
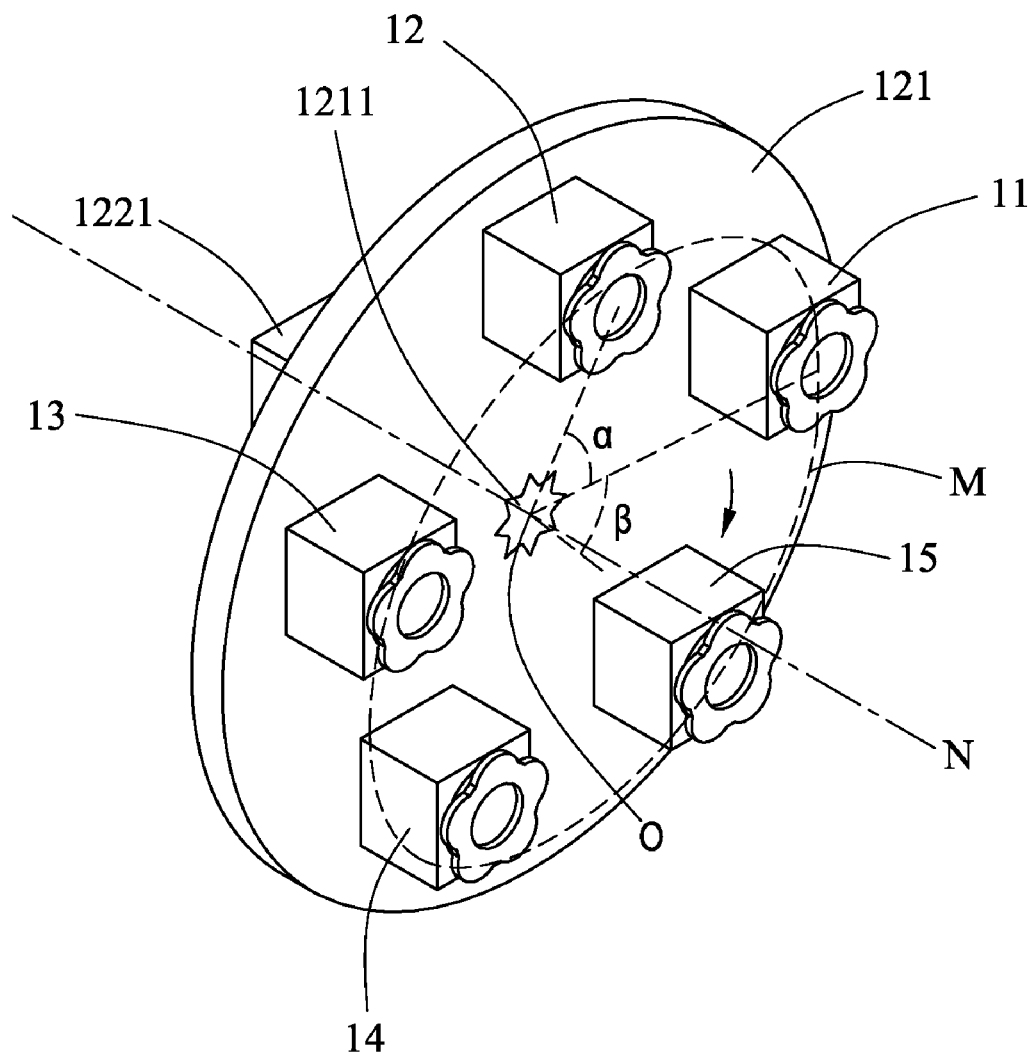
FIG. 2 is a schematic enlarged view of a rotatable base of the portable electronic device of FIG. 1.
Figure 3:
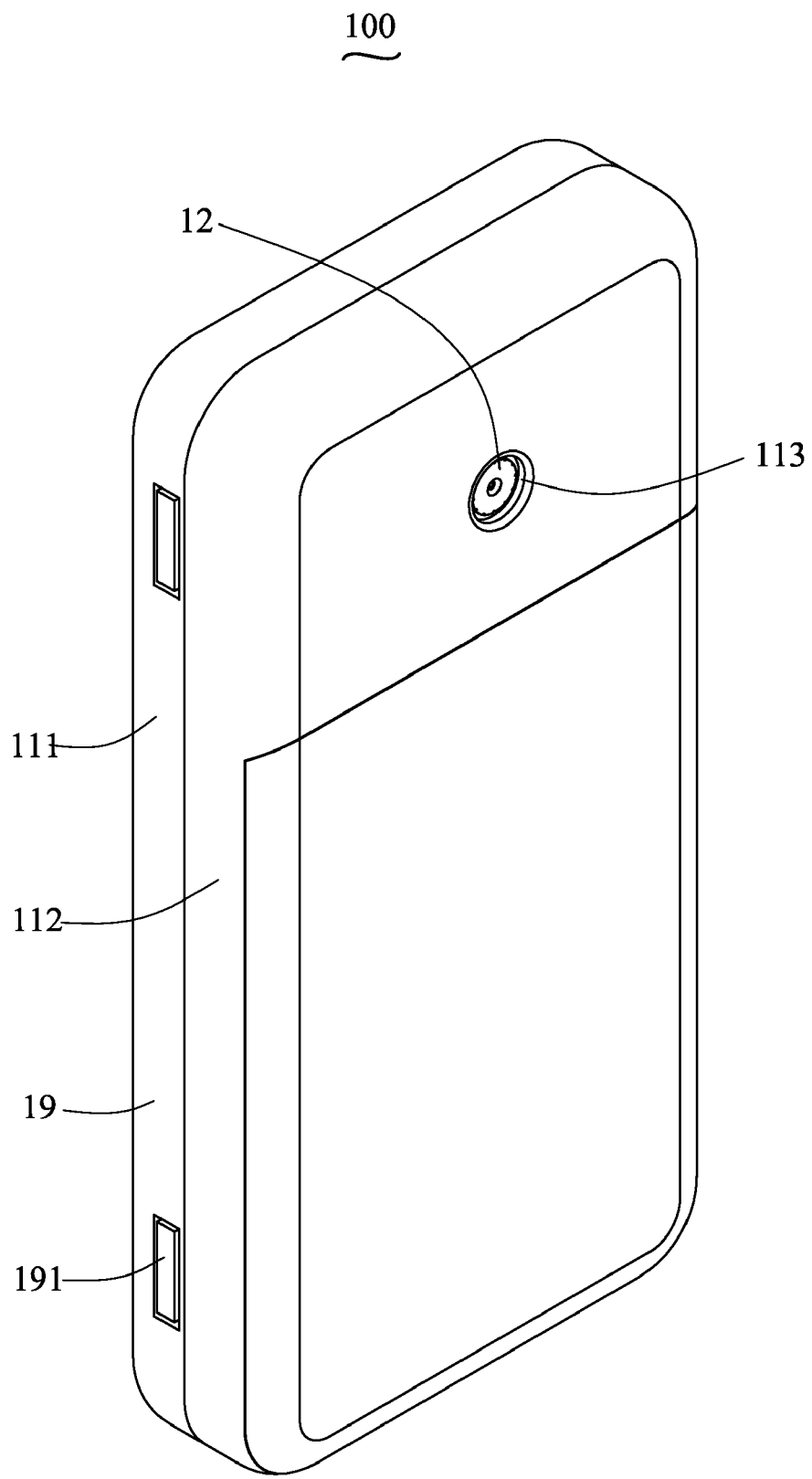
FIG. 3 is an isometric view of the portable electronic device of FIG. 1.

Referring to FIG. 1, FIG. 2 and FIG. 3, a portable electronic device 100 in accordance with a first embodiment, is shown. The portable electronic device 100 includes a housing 110 and a main body 120. The main body 120 is accommodated in the housing 110. In the present embodiment, the portable electronic device 100 is a mobile phone.

The housing 110 includes a front portion 111 and a rear portion 112. The front portion 111 and the rear portion 112 are assembled with each other to accommodate the main body 120, as shown in FIG. 3. The housing 110 has an image pickup window 113 defined on the rear portion 112 of the housing 110. In the present embodiment, the image pickup window 113 is, but not limited to, in a circular shape.

The main body 120 includes a first lens module 11, a second lens module 12, a rotatable base 121 and a driving element 122. The first lens module 111 and the second lens module 12 are disposed on the rotatable base 121 by adhesive, as shown in FIG. 2. The first lens module 11 and the second lens module 12 can be different kinds of lens modules, e.g. zoom lens module, wide-angle lens module, ultra-angle lens module, telephoto lens module, and so on. That is, the first lens module 11 and the second lens module 12 can separately achieve different optical functions. However, it is understood that the number of lens module 11, 12 disposed on the rotatable base 121 is not limited to two. In the present embodiment, there are five lens modules 11, 12, 13, 14, 15 configured for achieving different optical functions, disposed on the rotatable base 121.

The driving element 122 is connected to the rotatable base 121, which is disposed corresponding to the image pickup window 113. The driving element 122 can drive the rotatable base 121 to rotate to selectively allows one of lens modules 11, 12, 13, 14 or 15 to be aligned with the image pickup window 113 to capture an image of an object outside the image pickup window 113. Particularly, the driving element 122 includes a motor 1221 and a transmission element 1222. The motor 1221 drives the transmission element 1222. The transmission element 1222 is connected to the rotatable base 121 so as to transmit the rotatable force to rotate the rotatable base 121. Additionally, the main body 120 can further include a circuit (not shown) electrically connected to the driving element 122. The circuit can control the driving element 122 to operate. However, the rotatable base 121 is not limited to be driven automatically. Alternatively, the rotatable base 121 can be rotated manually. In the present embodiment, the transmission element 1222 includes a gear. The motor 1221 can be an electrostatic micromotor or a magnetic microstepping motor.

Referring to FIG. 2, the rotatable base 121 is in a disk-like shaped. The rotatable base 121 has a toothed hole O defined at the center thereof. The toothed hole O is meshed with the transmission element 1222. The rotatable base is rotatable about an axis N. In the present embodiment, the lens modules 11, 12, 13, 14, 15 are disposed on a side of the rotatable base 121 facing away from the transmission element 1222. In addition, the lens modules 11, 12, 13, 14, 15 are spaced a distance from the axis N. That is, the distance between each of the lens modules 11, 12, 13, 14 or 15 and the toothed hole O is about equal. In the present embodiment, an inclined angle α made by the lines connecting one of the adjacent lens modules 11, 12 to the toothed hole O of the rotatable base 121 is about 72 degrees.

In addition, optical axes of the lens modules 11, 12, 13, 14, 15 are parallel to the axis N associated with the rotatable base 121. The openings of lens modules 11, 12, 13, 14, 15 are configured for allowing light to enter and facing the same direction toward the image pickup window 113. For obtaining desired images, the specific lens modules 11, 12, 13, 14 or 15 can be selected and driven to align with the image pickup window 113 by rotating the rotatable base 121. In such case, the portable electronic device 100 can further include a switch 191 configured for activating or deactivating the driving element 122 to operate at will so as to allow the desired lens module 11, 12, 13, 14 or 15 to perform image pickup by user.

In use, when a specific lens module 11, 12, 13, 14 or 15 is selected for image capturing, the circuit generates a controlling signal and transmits it to the motor 1221. The motor 1221 drives the transmission element 1222 connected to the rotatable base 121. Therefore, the rotatable base 121 can rotates clockwise or counter-clockwise by the rotatable force transmitted from the transmission element 1222. Particularly, the rotatable base 121 is driven to rotate at an angle unit β to allow the lens module 11, 12, 13, 14 or 15 to be aligned with the image pickup window 113. In the present embodiment, the degree of the angle unit β is the same as the degree of the inclined angle α, e.g. 72 degrees.

For example, if the lens module 11 faces the image pickup window 113, i.e. at a start position, and the lens module 12 is selected by user, the rotatable base 121 rotates one angle unit β, i.e. 72 degrees, in a clockwise direction to allow the desired lens module 12 to face the image pickup window 113. After that, if another lens module 13 is selected, the rotatable base 121 rotates again to advance one more angle unit β to allow the lens module 13 to face the image pickup window 113. In such case, the portable electronic device 100 can further include a sensor disposed on the rotatable base 121 (not shown). The sensor can be a magnetic sensor or an optical sensor to detect the value of the rotated angle units β of the rotatable base 121. Moreover, for storing the data of movement of the lens modules 11, 12, 13, 14, 15 the portable electronic device 100 can further include a memory module to storing such data. Therefore, the positions of the lens modules 11, 12, 13, 14, 15 can be detected and be memorized/stored for facilitating the desired lens module 11, 12, 13, 14 or 15 to be rotated to desired position.

However, the mechanism for position the desired lens module 11, 12, 13, 14 or 15 is not limited to what mentioned above. As mentioned above, the lens module 12 and the lens module 13 can be selected separately to be aligned with the image pickup window 113. After the lens module 12 aligning with the image pickup window 113, the rotatable base 121 can rotate in counter-clockwise direction to return to the position where the lens module 11 faces the image pickup windows 113. Then, the rotatable base 121 is driven to rotate two angle units β, i.e. 144 degrees, in clockwise direction so as to allow the lens module 13 to align with the image pickup window 113.

Figure 4:
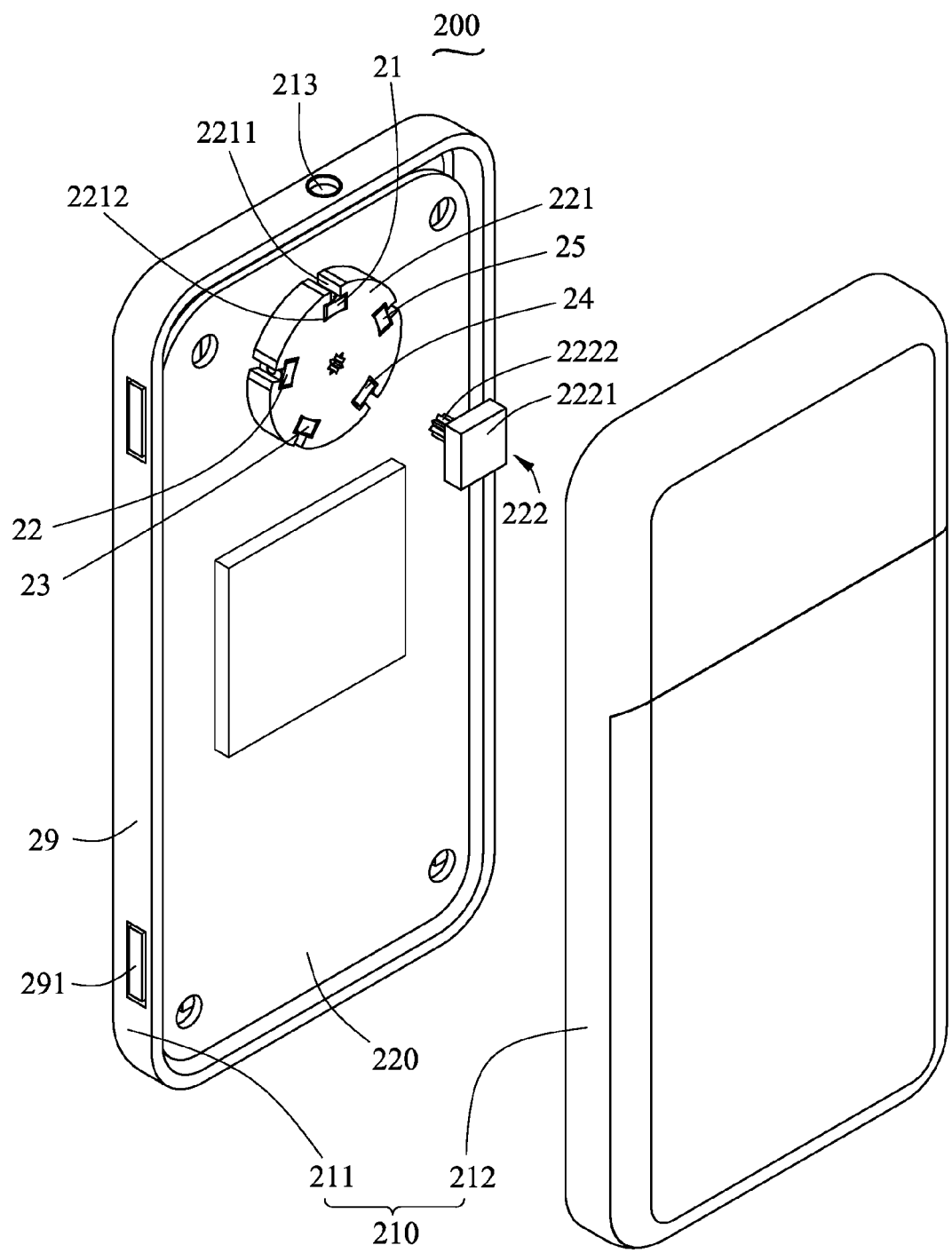
FIG. 4 is a schematic exploded view of a portable electronic device in accordance with a second embodiment of the present invention.
Figure 5:
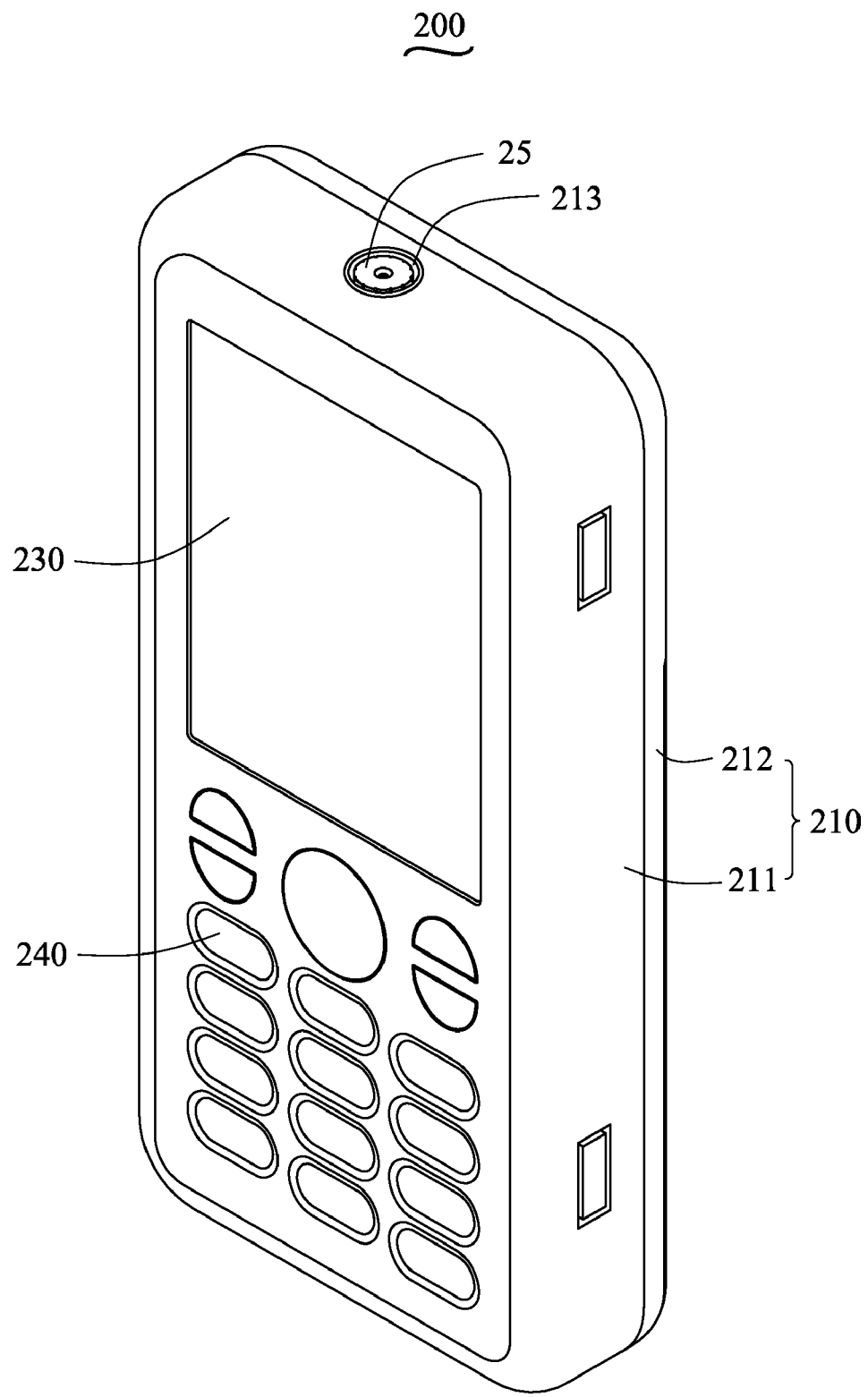
FIG. 5 is an isometric view of the portable electronic device of FIG. 4.
Figure 6:
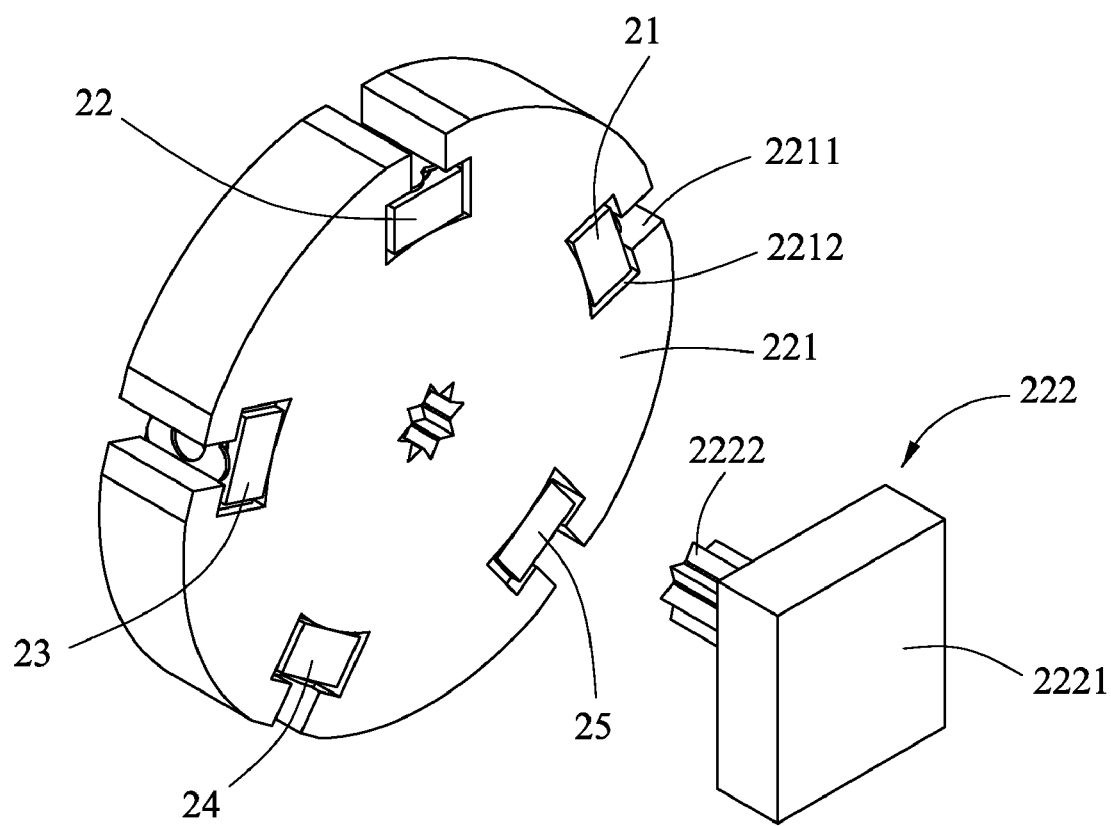
FIG. 6 is a schematic enlarged view of a rotatable base of the portable electronic device of FIG. 4.

Referring to FIG. 4, FIG. 5 and FIG. 6, a portable electronic device 200 in accordance with a second embodiment of the present invention, is shown. The portable electronic device 200 includes a housing 210 and a main body 220. The main body 220 is accommodated in the housing 210.

The portable electronic device 200 of the second embodiment is similar to the portable electronic device 100 of the first embodiment. The difference is that an image pickup window 213 is defined on a front portion 211 of the housing 210. Particularly, the image pickup window 213 in the present embodiment is provided on the top side of the portable electronic device 200. In addition, a rotatable base 221 in the present embodiment has a plurality of receiving spaces 2212 disposed along the circumference thereof, as shown in FIG. 6. The lens modules 21, 22, 23, 24, 25 with different optical functions are received within the receiving spaces 2212. In the present embodiment, the receiving spaces 2212 are slots formed around the lateral wall 2211 of the disk-like rotatable base 221. The rotatable base 221 can be driven by the driving element 222 and then allows each of the lens modules 21, 22, 23, 24 or 25 to be aligned with the image pickup window 213 defined on the top side of the portable electronic device 200. In such case, optical axes of the lens modules 21, 22, 23, 24, 25 are perpendicular to the axis N associated with the rotatable base 221.

In conclusion, by ways of disposing the lens modules with different optical functions on the rotatable base, the portable electronic device can easily achieve multiple image pickup functions. In addition, the portable electronic device in such design is compact.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A portable electronic device, comprising:
   a housing having an image pickup window; and
   a main body accommodated in the housing, the main body comprising at least two lens modules, a rotatable base, and a driving element, the rotatable base carrying the at least two lens modules thereon, the driving element configured for driving the rotatable base to rotate a non-negative integer multiple of an angle unit β to selectively allow any one of the at least two lens modules to be aligned with the image pickup window;
   wherein the rotatable base has a toothed hole defined at the center thereof, the rotatable base at the toothed hole is meshed with a transmission element, an included angle α is defined by two lines connecting centers of two adjacent of the at least two lens modules to a center of the toothed hole of the rotatable base, and the included angle α is 360 degrees divided by the number of the at least two lens modules; and
   wherein an optical axis of each of the at least two lens modules is perpendicular to an axis associated with the rotatable base.

2. The portable electronic device as claimed in claim 1, wherein the driving element comprises a motor and a transmission element, the motor is configured for driving the rotation of the transmission element, and the transmission element is connected to the rotatable base.

3. The portable electronic device as claimed in claim 2, wherein the transmission element includes a gear meshed with the rotatable base.

4. The portable electronic device as claimed in claim 2, wherein the motor is an electrostatic micromotor or a magnetic microstepping motor.

5. The portable electronic device as claimed in claim 1, wherein the rotatable base has a plurality of receiving spaces respectively receiving the at least two lens modules.

6. The portable electronic device as claimed in claim 1, wherein the rotatable base is rotatable about the axis associated with the rotatable base, and the at least two lens modules are spaced a distance from the axis associated with the rotatable base.

7. The portable electronic device as claimed in claim 1, wherein the at least two lens modules are evenly arranged on the rotatable base.

8. A portable electronic device comprising:
a housing having an image pickup window;
a supporting base received in the housing, the supporting base being rotatable about a rotating axis;
a plurality of camera modules mounted on the supporting base, each of the camera modules including an image sensor and a lens module, each lens module having an optical axis perpendicular to the rotating axis, the optical axes of the lens modules extending radially with respect to the rotating axis, an included angle defined by the optical axes of each two adjacent lens modules meeting at the rotating axis being an angle unit $\beta$; and
a driving element configured for driving the supporting base to rotate a non-negative integer multiple of the angle unit $\beta$ to selectively align one of the camera modules with the image pickup window;
wherein the supporting base has a toothed hole defined at the center thereof, the supporting base at the toothed hole is meshed with a transmission element, an included angle $\alpha$ is defined by two lines connecting centers of two adjacent of the camera modules to a center of the toothed hole of the supporting base, and the included angle $\alpha$ is 360 degrees divided by the number of camera modules.

* * * * *